(12) United States Patent
Jepson et al.

(10) Patent No.: US 6,970,536 B2
(45) Date of Patent: Nov. 29, 2005

(54) METHOD AND APPARATUS FOR PROCESSING A VOICE SYSTEM APPLICATION

(75) Inventors: Raymond Jepson, Chandlers Ford (GB); Bernard Zdzislaw Kufluk, Southampton (GB)

(73) Assignee: International Business Machines Corporation, Armonk, NY (US)

( * ) Notice: Subject to any disclaimer, the term of this patent is extended or adjusted under 35 U.S.C. 154(b) by 691 days.

(21) Appl. No.: 10/135,704

(22) Filed: Apr. 30, 2002

(65) Prior Publication Data

US 2003/0202644 A1 Oct. 30, 2003

(51) Int. Cl.[7] ............................................. H04M 11/00
(52) U.S. Cl. ................... 379/88.18; 719/328
(58) Field of Search ..................... 379/88.18; 739/328; 717/139

(56) References Cited

U.S. PATENT DOCUMENTS 6,594,685 B1 * 7/2003 Mishra et al. .............. 709/203
2003/0101292 A1 * 5/2003 Fisher et al. ................ 709/328
2004/0071275 A1 * 4/2004 Bowater et al. .......... 379/88.18

* cited by examiner

*Primary Examiner*—Xu Mei
*Assistant Examiner*—Walter F Briney, III
(74) *Attorney, Agent, or Firm*—Jerry W. Herndon

(57) ABSTRACT

There is described an interactive voice response system comprising: a voice application including an voice application API command defining a function call to a first communication process; a channel process for interpreting the voice application API command and making the defined function call; a signaling process for receiving the function call and for performing the first communication process; characterised by; said signaling process having a second communication process; tag information embedded in the voice application and related to the API command; a tag interpreter for reading the tag information in the voice application and passing the tag information to a tag process in the signaling process; and a tag process for reading the tag information and, if related to the API command, directing the signaling process to perform the second communication process rather than the first communication process.

20 Claims, 4 Drawing Sheets

METHOD AND APPARATUS FOR PROCESSING A VOICE SYSTEM APPLICATION

This invention relates to a method and apparatus for processing a voice system application in a computer telephony integration environment. In particular this invention relates to processing voice system application extended functions in an interactive voice response (IVR) system.

BACKGROUND

An interactive voice response (IVR) system is a communications system for handling telephony calls in a telephone network (see FIG. 1). The important components of an IVR for the purposes of this description include: a voice application; a channel process for interpreting the voice application; and a signaling process for performing the telephony functions as requested by the channel process (see FIG. 2).

An application developer programs the voice application (using an application API) so that the IVR may perform a complex interaction with a caller. For example, the application may be a voice mail application for handling the receipt of a call from a caller, it does this by playing a voice prompt greeting and recording the call in a voicemail box. The application uses an application programming interface (API) that defines API commands, each API command corresponds with a process to be performed in the IVR. Each API command has API parameters that are used by the process to perform the required function. Another example of an application makes outbound call to a telephone on the network and plays pre-recorded message for the purposes of marketing.

A channel process may be one of many channel processes that can be in operation in the voice processing system; one channel process is opened for each voice channel or telephony call that is handled by the telephony voice processing. For instance, on both occasions when a call is made from and to the system, a channel process is opened. It is the channel process that interprets the application API command to make a call and the associated application API command parameters which affect the properties of the make call function; it then sends a message containing the API parameters to the signaling process requesting that a specific process is performed.

The signaling process is an IVR component written by a system developer that enables the IVR to communicate with an external communication system. For instance, to communicate with an ISDN network the IVR requires an ISDN signaling process. For each type of network that communicates with the IVR a signaling process of that type is needed. The channel process sends a message to the signaling process in a format defined by the signaling process API.

Although the embodiment is described in terms of an ISDN signaling process, the invention may also be implemented using a signaling process for an SS7 communication network or a Voice over IP network (VoIP).

The specification of a network system changes over time with improvements in the network system. This in turn leads to changes in the application API whereby the improvements to the network system can be used by the application programmer in the voice application.

The channel process is quite inflexible when it comes to extending a function in the signaling process. When the application API is extended it is necessary to both modify the channel process and the signaling process code base so that the channel process can interpret the extended function and the signaling process can process it. However, modifying both the channel process and the signaling process each time a function extension is required is tedious, leads to complications and ultimately increases the risk of a system crash due to a bug in the code. This problem is compounded in an IVR that uses a signaling library to provide the messaging between the channel process and the signaling process; the signaling library also needs modification each time an API extension is made.

A further problem occurs if the modified channel process is not backwards compatible with applications using the previous version of the API. If the syntax of the application is not understood then the channel process or the signaling process will return an error message and not perform their functions.

SUMMARY OF INVENTION

According to a first aspect of the present invention there is provided an interactive voice response system as described in claim 1.

The invention provides a tagging language extension to the voice application API. This tagging language extension allows for future extensions of the signaling process without having to make further changes to the voice application API or the channel process code base. Accessibility of extensions in the signaling process functionality is allowed without having to change the voice application API and therefore all voice applications are backwards compatible.

Advantageously the second communication process is a modified first communication process. This allows for small changes to the signaling process base code to be implemented and used if the appropriate tag information is included.

Preferably the tag information is written into a system variable, the system variable is reserved for use for the tagging language API extension. A system variable in the context of the embodiment is a variable which may be passed to and from a channel process and a signal process with control messages. This is necessary because the system variable is local not a global variable.

Advantageously return information from the second communication process is written into a further system variable. If the second communication has additional return information to the first communication process then the return path of the first communication path can not be used, therefore the second communication process takes advantage of the use of read tag language extensions to read tag information from system variables.

Preferably the tag information is a string variable. This allows easy manipulation of the system variables using well known string manipulation commands.

The signaling process is one of: an ISDN signaling process; an SS7 signaling process; or a VOIP signaling process.

According to a second aspect of the invention there is provided an interactive voice response method in an IVR system as described in claim 8.

According to a third aspect of the invention there is provided a computer program product comprising computer readable media having executable means for an interactive voice response system as described in claim 14.

DESCRIPTION OF DRAWINGS

An embodiment of the invention will now be described, by means of example only, with reference to the accompanying drawings in which.

DESCRIPTION OF THE EMBODIMENTS

Figure 1:
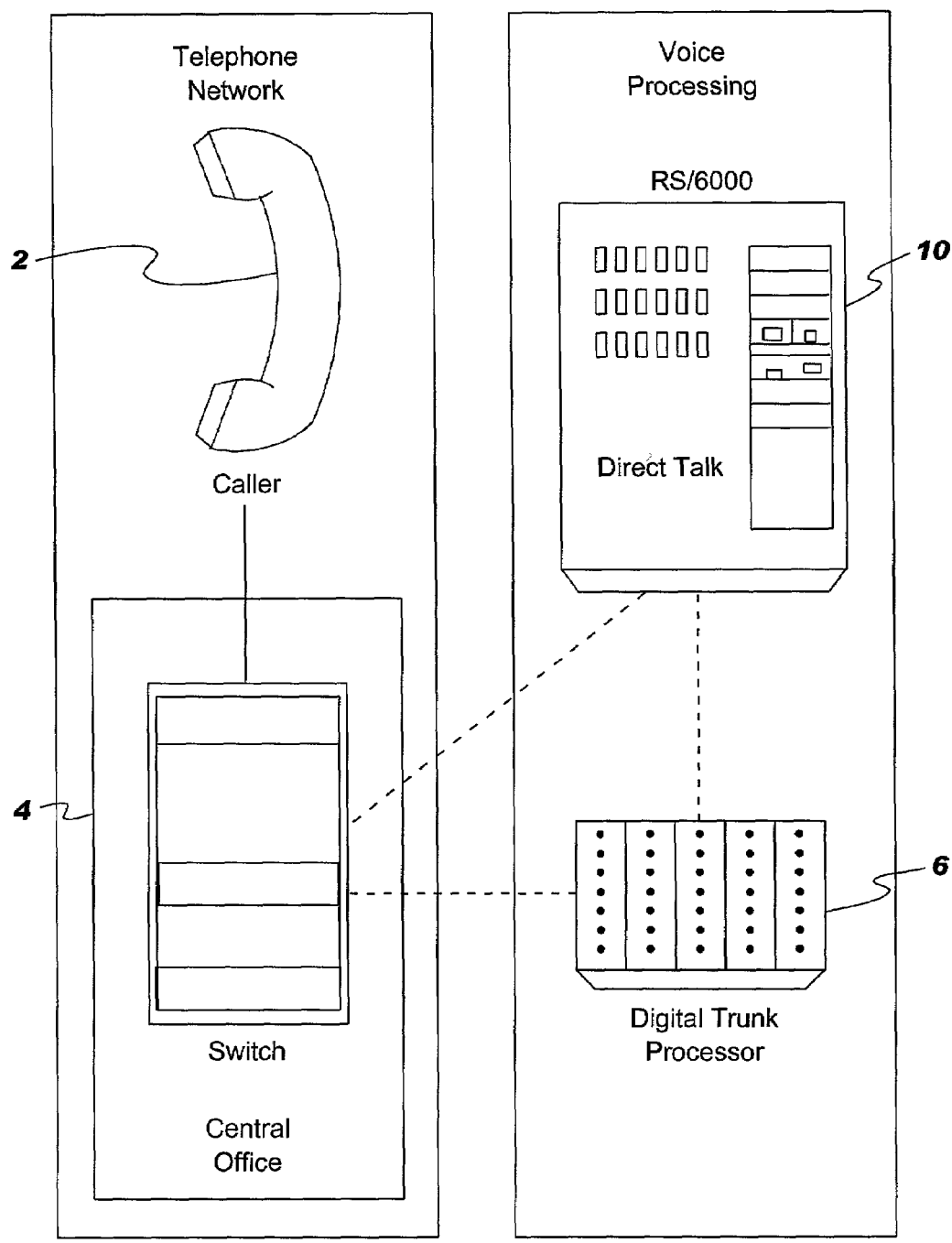
FIG. 1 shows a schematic drawing of an interactive voice response system in a telephone network.

FIG. 1 shows a schematic drawing of a voice processing system connected to a telephone network. The telephone network comprises a caller 2 connected to a central office telephony switch 4. The voice processing system comprises an interactive voice response (IVR) system 10 connected to a digital trunk processor 6. The IVR 10 performs the voice processing and uses the trunk processor 6 to communicate with the telephone network and ultimately with the caller.

Figure 2:
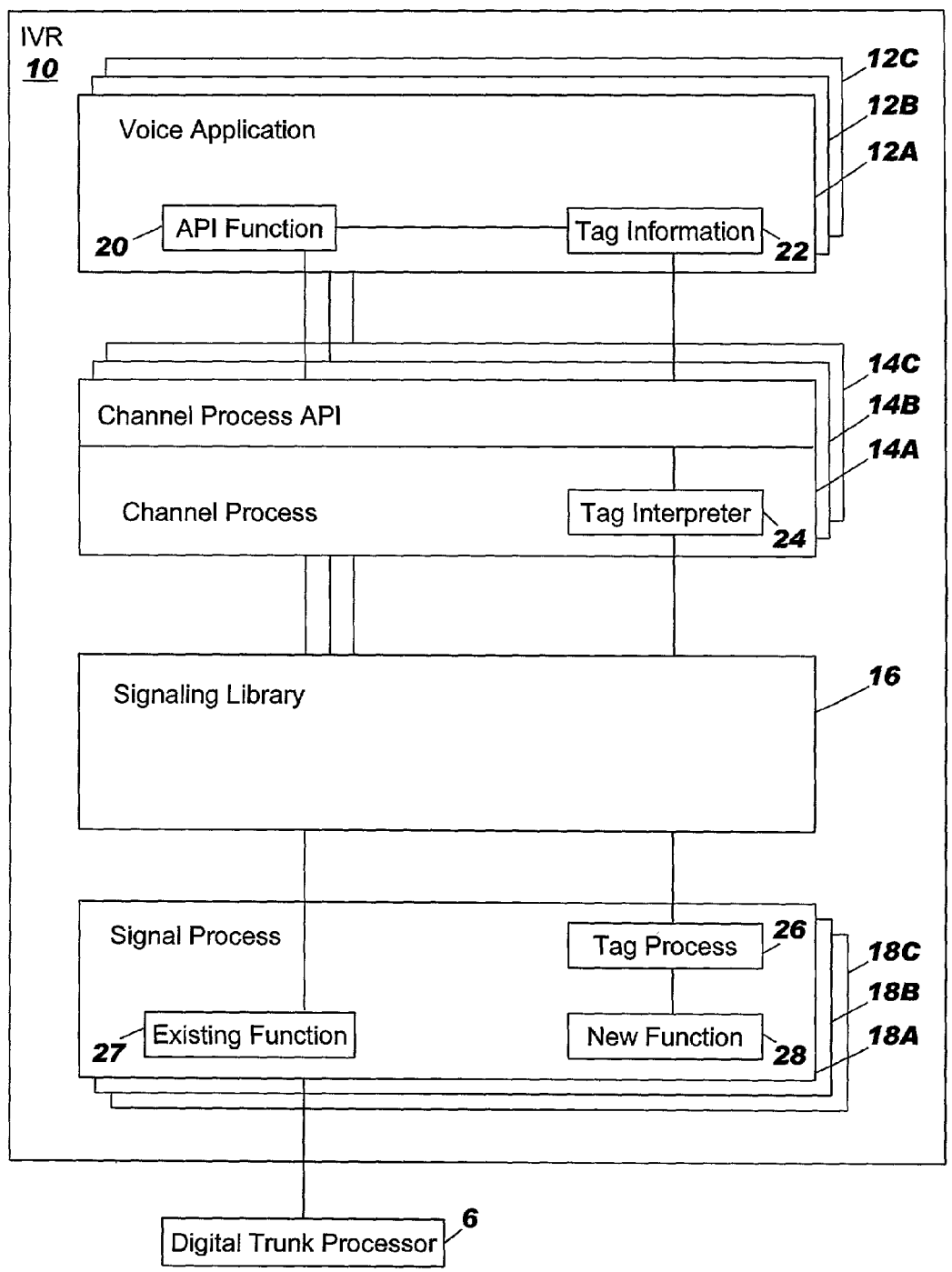
FIG. 2 shows a schematic drawing of the components of the IVR according to the embodiment.

FIG. 2 shows a schematic drawing of the components of the IVR according to the embodiment. The IVR 10 includes one or more voice applications 12A,B,C; one or more respective channel processes 14A,B,C to execute the voice applications; a signaling library 16 for queuing and sending messages to and from the channel processes 14A,B,C;

one or more signaling processes 18A,B,C providing the functionality to interact with the communication network over the digital trunk processor 6.

In the prior art, the channel process 14A would interpret a voice application command 20 in the voice application 12A and if appropriate, sends a control message via the signal library 16 to the signaling process 18. Such a control message is typically a request to make a call over the network and is serviced by the signaling process 18 using existing functions 27. The corresponding voice application API command is 'MakeCall'.

However, in the embodiment of the invention as shown in FIG. 2, tag information 22 is embedded in the voice application 12. The channel process 14 includes a tag interpreter 24 for reading the tag information 22. The signaling process 18 has been modified and includes a tag process 26 and at least one new function 28.

The voice application comprises API commands with associated parameters. The channel process interprets the API command and parameters and sends a control message to the signaling process. For instance, the voice application API command 'MakeCall' is interpreted by the channel process 14A to send a control message to the signaling process to open a telephony channel on the digital trunk processor. Several voice application parameters follow the 'MakeCall' command (e.g. (",",0,0,0)) and are forwarded by the channel process 14A to the signaling process 18A so that options in the existing function 27 can be set.

The voice application also comprises API commands which are not sent to the signaling process but which are used to change system variables in the IVR 10. In this embodiment such system variables are not global but are sent between the channel processes and the signaling process. For instance, 'AssignData' assigns data to a system variable and has four parameters. The parameters of the 'AssignData' API command are: the name of the system variable; the assign data extension; the attribute name; and the information or data. This command is used to build a tag in a system variable for use in the channel process and the signaling process. The data is assigned to the tag in the form of a string so that many attributes can be set in the same system variable. For instance <'CLGN'='1234' 'NUMBER TYPE'='1' 'NUMBER PLAN=1' 'SCREEN'='0' 'PRESENT'='1'> is a tag in string form containing five attributes set to different values. The 'AssignData' command builds the tag one attribute at a time using 'Put_Tag' and 'Put_Attribute' extensions to the 'AssignData' voice application API command. The 'Put_Tag' extension creates a tag with the attribute name and the information contained in the 'AssignData' parameters. The 'Put_Attribute' extension adds information to the tag indicated by the attribute name in the system variable. Other 'AssignData' extensions which are not relied on in this description of the embodiment are briefly described: 'Remove_Tag' deletes a tag from a system variable; 'Remove_Attribute' delete an attribute from a tag in a system variable; 'Get_Tag' gets the name of the tag in a system variable; and 'Get_Attribute_Value' gets the value of an attribute from a tag in a system variable. The invention is not limited to these extensions and other extensions may be created.

The voice application tag interpreter 24 has certain rules and syntax that form the Tag Application Programming Interface. This is not a separate API but is an extension of the voice application API. The system variable SV541 might look like <'tag_label'='tag_value' 'attribute'='value' 'attribute2'='value2' . . . > <'tag_label2'='tag_value2'. The broad set of rules that the application developer must adhere to when using extended functionality in the signaling process are listed. 'tag_label' represents the tag label. 'attribute' represents the attribute label. Duplicates of tag labels (in string of tags) or attribute labels (within a tag) are not allowed. 'tag_label'='value' is a tag sub string. 'attribute'='value' is an attribute sub string. <'tag'='value' 'attribute'='value'> is a tag (string). A tag string can contain multiple attribute sub strings but only one tag sub string (in front). Labels and values may both be empty strings—e.g. <"=" "=" 'a'="> is valid. Tag strings will follow each other directly with no characters in between. Tag and attribute sub strings are separated by blank spaces. Tag labels cannot contain a dot ('•') character. All other characters (except '\0') are valid. All characters (except '\0') are valid for values and for attribute labels.

The signaling process has its own tag API with manipulation functions that correspond to the voice application tag API functions: Sl_put_tag; Sl_put_attribute; Sl_change_tag_value; Sl_get_tag; Sl_get_tag_value; Sl_get_attribute_value; Sl_find_n_tag; Sl_remove_tag; Sl_remove_attribute. The tag process API allows the system developer to create new function in the signaling process using this defined tag process API. The application developer will use the voice application tag API.

System variable SV541 is used to send call information from a voice application to a signaling process via a signaling library request block. The variable provides call information for ISDN or SS7, or can be tailored to provide tags specific to custom-written signaling processes. This call information is passed in the form of a string containing tagged data values and attributes. The length of the string varies depending on the number of tags and data contained within the tags.

System variable SV542 is passed from a signaling process to a voice application and contains information about a call such as calling party data or the service to which they wish to be connected. The call information is put together by ISDN or SS7, or can be tailored to provide tags specific to custom-written signaling processes. This call information is passed in the form of a string containing tagged data values and attributes. The length of the string varies depending on the number of tags and data contained within the tags. For incoming calls, SV542 may contain call setup information from the onset of the first state table invoked.

System variable SV543 is passed from a signaling process to a state table and contains call information relating to a disconnect {such as cause and diagnostics in the event of a far-end caller or network hangup}. The call information is put together by ISDN or SS7, or can be tailored to provide tags specific to custom-written signaling processes. This call information is passed in the form of a string as with SV543. All other signaling operations are synchronous from the state table perspective; that is to say that signaling operations such as MakeCall will block until a response is seen from the network. Far end disconnects when a callee/caller hangs up are not an operation requested by the state table and a hang up could happen at any time during the execution of the state table. The information from a disconnect cannot be written into SV542—as the state table could be reading from SV542 at that time to find some information from the previous signaling request. Thus SV543 was constructed to cope with this asynchronous event. Disconnect information can be written to SV543 without overwriting the information from the previous synchronous operation.

Figure 3:
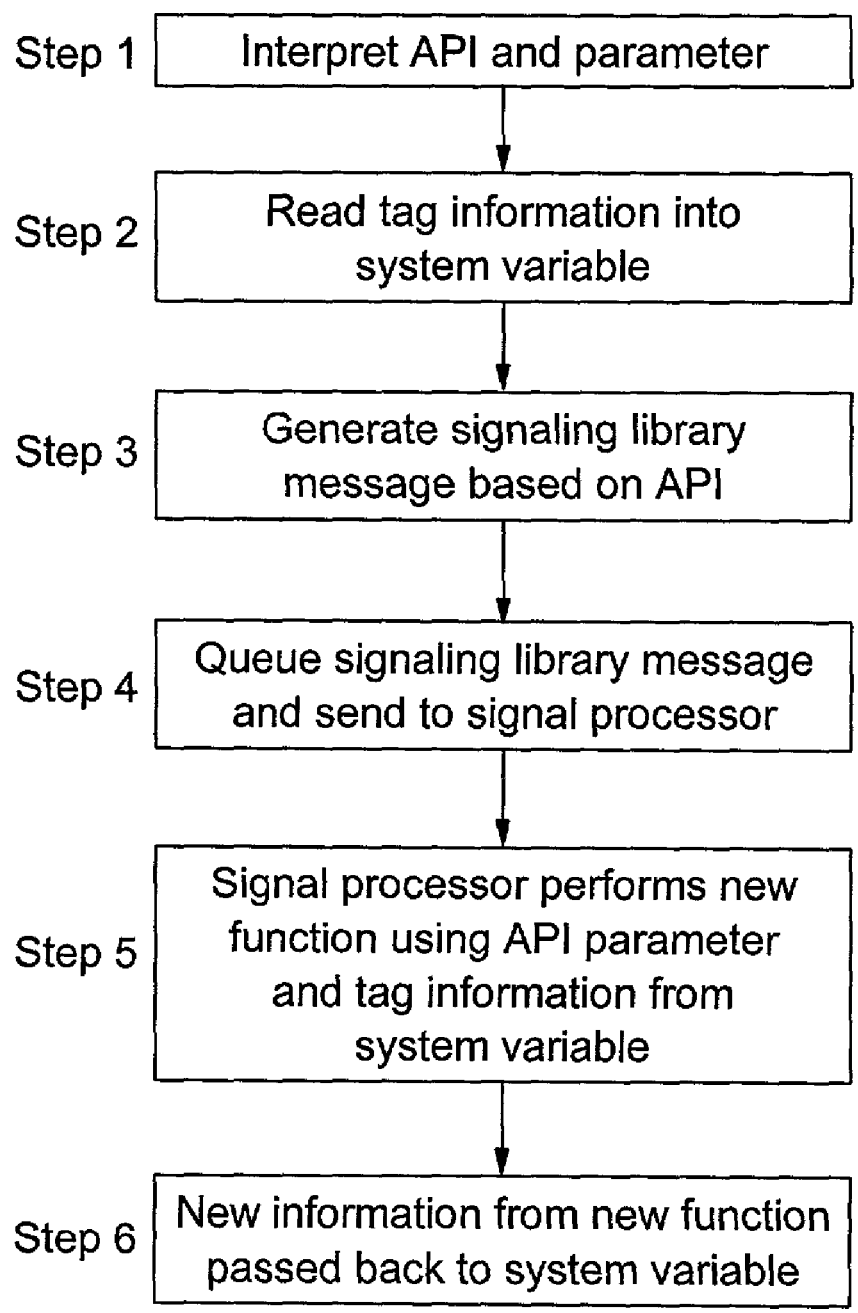
FIG. 3 shows a schematic of the method used in the IVR according to the embodiment.

The process performed by the embodiment of FIG. 2 is now described with reference to FIG. 3. A voice application 12 is loaded on an IVR 10, the application's purpose is to make a call to caller 2 through the switch 4 in the telephony network and play a voice prompt, for example to offer the caller a product or service. The new functionality 28 added to the signaling process is the ability to suppress the calling number. This is an extended function of the 'MakeCall' voice application API command and only requires a modification of the existing MakeCall code in the signaling process. This new functionality is accessed through the tag API. In order to suppress a call the voice application has to write to system variable SV541 a specified string that will be recognised by the signaling process 18. In this example the specified string needs to include a variable 'CLGN' which represents a Calling party Information Element and this variable needs to be set to '1234'. The voice application may be more complex than the example in this embodiment and may offer the caller options to respond to the call, however for the purposes of the embodiment only, the make call part of the voice application is described.

Step 1, the processing of the voice application 12A is initiated; channel process 14A interprets the API commands and parameters. Step 2, some of these API commands include tag information, this information is read and written into a system variable SV541. In this case the API command is the 'AssignData' command and tag information containing the string 'CLGN'='1234' is written into SV541. Step 3, the API command 'MakeCall' and associated parameters are interpreted; a message is generated by the channel process 14A, such message includes a request for the signaling process to make a call and also includes the tag information in system variable SV541. Step 4, the signaling library queues the message before sending it to the signaling process. Step 5, the tagging process (part of the signaling process) checks the tag information in the system variable SV541 for the specified string, on finding it the signaling process is directed to use the modified make call function rather than the existing make call function. The modified make call function suppresses the call number whereas the unmodified make call function sends the call number. Step 6, the modified call function returns tag information in system variable SV542. This is available to the application programmer through the AssignData extensions.

Figure 4:
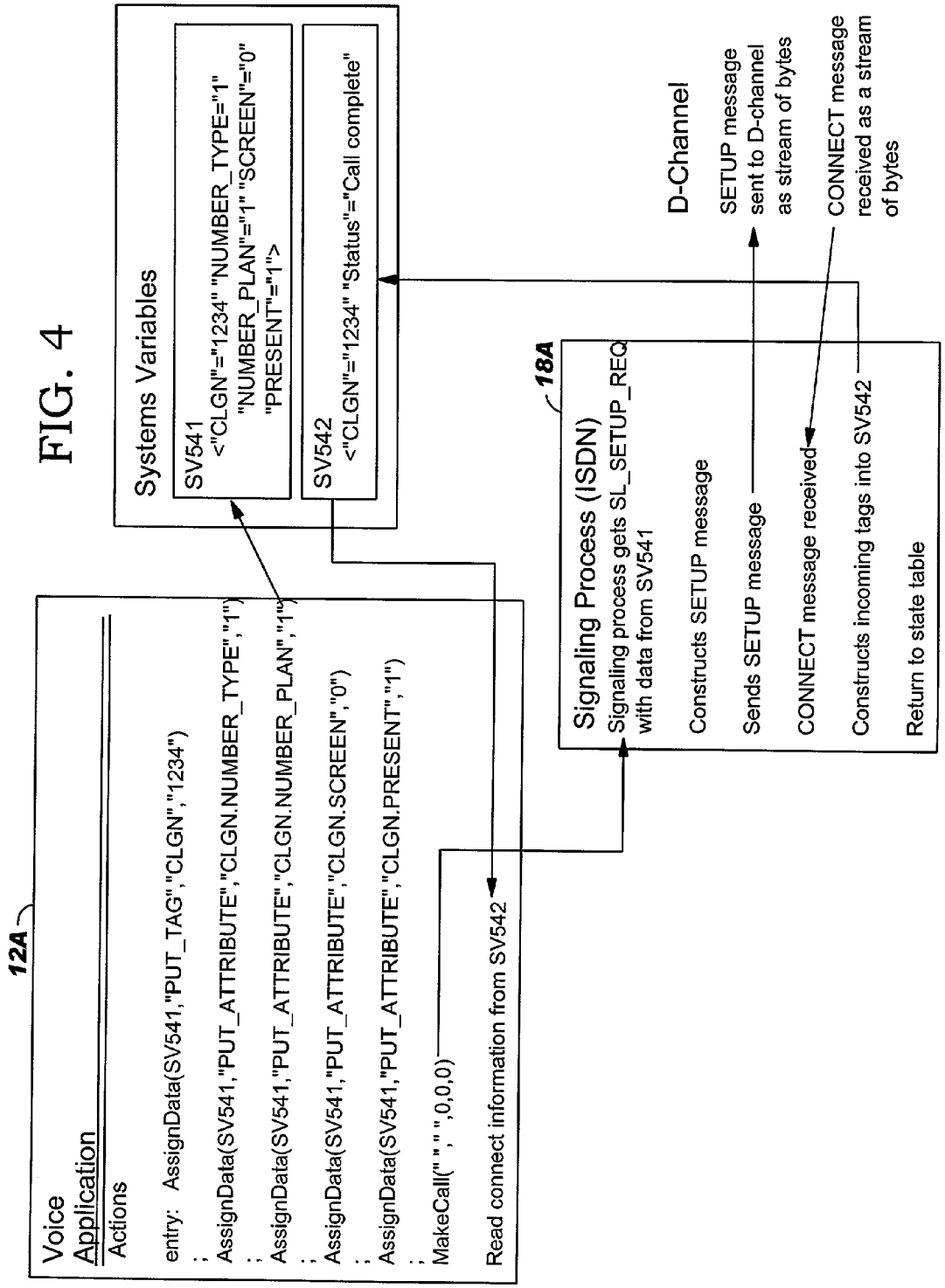
FIG. 4 shows an example of the voice application according to the embodiment.

The interaction between the voice application, system variables and signaling process is described in greater detail with reference to FIG. 4.

In this example the voice application 12A uses five AssignData commands to build the tag string in the system variable SV541. The first AssignData extension 'put_tag' defines the tag information string, CLGN specifies the Calling party Information Element and it is set to '1234', this is the number which indicates to the signal process to perform the modidied function to suppress the calling number. Attributes are added to the tag string in SV541 to modify some of the fields in the tag information string using 'put_attribute' extension. Number type and plan specify the number type and plan for the outgoing call—in this case represents international number type and ISDN numbering plan. Screening and presentation affect how the calling number is generated and displayed. The presentation value of 1 tells the switch that the calling number will be restricted and will not be shown to the called party. Each of the attribute fields in the tag string represents a set of bits within the Calling party Information Element of the SETUP message; the user is insulated from needing to know the detail of these bit fields. Now that the tag string is constructed the state table can execute the action Makecall. MakeCall will send a message to the signaling process to request an outbound call. The information from the system variable will be attached to this message. The signaling process at the call control level generate a SETUP message and will process the incoming tags using the tag manipulation functions for signaling processes and construct a structure containing the information and the outbound message. The tags are checked for validity by the tag process.

In this embodiment three systems variables are defined to be used in the tag process but any number of variables could be defined. In this embodiment the computing platform is IBM's DirectTalk running on an IBM RS/6000 but any IVR which uses voice applications, channel processes and signaling processes in the same way can implement the invention. This embodiment will describe the invention with respect to one voice application 12A and channel process 14A but the invention can operate with one or more applications and channel processes operating independently and simultaneously. In the DirectTalk environment the voice applications are called state tables because the language used to write them is a state based language. However any language can be used to implement the invention and the embodiment is not intended to restrict it to state table language. For instance Java and especially visual Java is becoming popular and the invention can also implemented with Java voice applications. In this embodiment the new function is the ability to suppress the calling number from being sent from the switch but the invention is not limited to this function and can be any extension of an existing function or even a completely new function.

The following terms are trademarks of International Business Machines Corporation in the United States, other countries or both: IBM, DirectTalk, Java and all Java-based Trademarks and logos are trademarks or registered trademarks of Sun Microsystems, Inc in the United States, other countries, or both.

What is claimed is:

1. An interactive voice response system comprising:
   a voice application comprises voice application command defining a function call to a first communication process;
   a channel process for interpreting the voice application command and making the defined function call;
   a signaling process for receiving the function call and for performing the first communication process; characterised by;
   said signaling process having a second communication process; tag information embedded in the voice application and associated with the voice application command;
   a tag interpreter for reading the tag information in the voice application and passing the tag information to a tag process in the signaling process; and
   a tag process for reading the tag information and, directing the signaling process to perform the second communication process rather than the first communication process.

2. A system as claimed in claim 1 wherein the second communication process is a modified first communication process.

3. A system as claimed in claim 1 wherein the tag information is written into a system variable.

4. A system as claimed in claim 3 wherein the system variable is reserved for use for the tag information.

5. A system as claimed in claim 3 wherein the return information from the second communication process is written into a further system variable.

6. A system as claimed in claim 1 wherein the tag information is a string variable.

7. A system as claimed in claim 1 wherein the signaling process is one of: an ISDN signaling process; an SS7 signaling process; or a VoIP signaling process.

8. An interactive voice response method for use in an IVR system, said IVR system comprising a voice application for defining a sequence of communication processes and a signaling process for performing the communication processes, said voice application having a voice application command and embedded tag information, said voice application command defining a function call to a first communication process and said tag information relating to a second communication process, said method comprising the steps of:
   passing the tag information to a system variable;
   interpreting the voice application API command and making the defined function call to a signaling process to execute the first communication process;
   receiving the function call at the signaling process;
   reading the tag information from the system variable, executing the second communication process rather than the first communication process.

9. A method as claimed in claim 8 wherein the second communication process is a modified first communication process.

10. A method as claimed in claim 8 wherein the system variable is reserved for use for the tag information.

11. A method as claimed in claim 8 wherein return information from the second communication process is written into a further system variable.

12. A method as claimed in claim 8 wherein the tag information is a string variable.

13. A method as claimed in claim 8 wherein the signaling process is one of: an ISDN signaling process; an SS7 signaling process; or a VoIP signaling process.

14. A computer program product comprising computer readable media having executable means for an interactive voice response system, said product comprising:
   means for providing a voice application including an voice application API command defining a function call to a first communication process;
   means for a channel process for interpreting the voice application API command and making the defined function call;
   means for a signaling process for receiving the function call and for performing the first communication process; characterised by;
   means for said signaling process having a second communication process; tag information embedded in the voice application and related to the API command;
   means for a tag interpreter for reading the tag information in the voice application and passing the tag information to a tag process in the signaling process; and
   means for a tag process for reading the tag information and, if related to the API command, directing the signaling process to perform the second communication process rather than the first communication process.

15. A product as claimed in claim 14 wherein the second communication process is a modified first communication process.

16. A product as claimed in claim 14 wherein the tag information is written into a system variable.

17. A product as claimed in claim 16 wherein the system variable is reserved for use for the tag information.

18. A product as claimed in claim 14 wherein the second communication process is written into a further system variable.

19. A product as claimed in claim 14 wherein the tag information is a string variable.

20. A product as claimed in claim 14 wherein the signaling process is one of: an ISDN signaling process; an SS7 signaling process; or a VoIP signaling process.

* * * * *